(12) United States Patent
Heeter et al.

(10) Patent No.: US 10,111,100 B2
(45) Date of Patent: Oct. 23, 2018

(54) MULTIDEVICE AUTHENTICATION

(71) Applicant: MICROSOFT CORPORATION, Redmond, WA (US)

(72) Inventors: Ross David Heeter, Seattle, WA (US); Jason Robert Tuck, Kirkland, WA (US); Cyrus Kanga, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 14/467,654

(22) Filed: Aug. 25, 2014

(65) Prior Publication Data

US 2016/0057140 A1 Feb. 25, 2016

(51) Int. Cl.
| | |
|---|---|
| *H04L 29/06* | (2006.01) |
| *H04W 12/08* | (2009.01) |
| *H04L 29/08* | (2006.01) |
| *H04W 4/80* | (2018.01) |

(52) U.S. Cl.
CPC ............ *H04W 12/08* (2013.01); *H04L 67/10* (2013.01); *H04L 67/16* (2013.01); *H04W 4/80* (2018.02); *H04L 63/0861* (2013.01); *H04L 63/101* (2013.01); *H04L 69/14* (2013.01)

(58) Field of Classification Search
CPC .......... G06F 21/32; G06F 21/41; G06F 21/35; G06F 2221/2117; H04W 12/06; H04W 12/08
USPC .......................................................... 726/4
See application file for complete search history.

(56) References Cited

U.S. PATENT DOCUMENTS

| | | | | |
|---|---|---|---|---|
| 7,415,721 B2* | 8/2008 | Fransdonk | ............... | G06F 21/10 380/281 |
| 7,526,792 B2* | 4/2009 | Ross | ................... | H04L 63/0263 713/154 |
| 7,549,576 B2* | 6/2009 | Alderucci | ............... | G07F 17/32 235/380 |
| 7,689,833 B2* | 3/2010 | Lange | ................ | A61B 5/04525 382/115 |
| 8,092,303 B2* | 1/2012 | Amaitis | .................. | G07F 17/32 463/16 |

(Continued)

FOREIGN PATENT DOCUMENTS

DE 102012103447 A1 10/2013

OTHER PUBLICATIONS

PricewaterhouseCoopers ('PwC'), 'Mobile proximity payment 5 things retailers should know', 2016, PwC, entire document, https://www.pwc.com/it/it/publications/assets/docs/mobile-proximity.pdf.*

(Continued)

*Primary Examiner* — Luu Pham
*Assistant Examiner* — Ronald Baum
(74) *Attorney, Agent, or Firm* — Shook, Hardy & Bacon, L.L.P.

(57) ABSTRACT

Aspects of the invention can log a user into a primary device in a more efficient manner. For example, aspects of the invention may eliminate the need for the user to supply user credentials directly to a primary device. Instead, the companion device recognizes relevant primary devices located proximate to the companion device and automatically initiates a user login to the primary device without user intervention. Aspects of the invention can automatically login a user to known and unknown primary devices.

19 Claims, 9 Drawing Sheets

(56) References Cited

U.S. PATENT DOCUMENTS

| | | | | |
|---|---|---|---|---|
| 8,156,246 | B2* | 4/2012 | Short | H04L 63/08 709/219 |
| 8,356,251 | B2 | 1/2013 | Strober | |
| 8,387,136 | B2* | 2/2013 | Lee | H04L 63/104 713/156 |
| 8,478,195 | B1* | 7/2013 | Hewinson | H04B 5/0031 235/379 |
| 8,512,150 | B2* | 8/2013 | Herrmann | G06Q 30/02 463/25 |
| RE45,039 | E* | 7/2014 | Laursen | G06F 21/41 455/403 |
| 8,840,018 | B2* | 9/2014 | Gelman | G07F 17/32 235/380 |
| 8,898,743 | B1* | 11/2014 | Kowalik | G06F 3/04842 726/4 |
| 9,183,693 | B2* | 11/2015 | Asher | G07F 17/32 |
| 9,196,121 | B2* | 11/2015 | Walker | G07F 17/32 |
| 9,230,395 | B2* | 1/2016 | Mattice | G06F 3/013 |
| 9,536,378 | B2* | 1/2017 | Gadher | G07F 17/3225 |
| 2008/0072064 | A1* | 3/2008 | Franchi | G06F 21/32 713/186 |
| 2008/0082355 | A1* | 4/2008 | Leach | G06Q 30/08 705/310 |
| 2008/0105751 | A1* | 5/2008 | Landau | A63F 13/10 235/492 |
| 2009/0113525 | A1* | 4/2009 | Rajan | H04L 63/102 726/4 |
| 2009/0260064 | A1* | 10/2009 | McDowell | G06F 21/10 726/4 |
| 2009/0298478 | A1* | 12/2009 | Tyhurst | H04W 4/50 455/414.1 |
| 2010/0116884 | A1* | 5/2010 | Alderucci | G06F 21/10 235/382 |
| 2011/0231332 | A1* | 9/2011 | Abraham | G06F 21/34 705/325 |
| 2012/0030734 | A1* | 2/2012 | Wohlert | H04L 63/101 726/4 |
| 2012/0059875 | A1 | 3/2012 | Clark | |
| 2012/0210119 | A1* | 8/2012 | Baxter | G06F 17/30861 713/150 |
| 2013/0032634 | A1 | 2/2013 | McKirdy | |
| 2013/0036458 | A1* | 2/2013 | Liberman | H04L 9/3231 726/6 |
| 2013/0151617 | A1* | 6/2013 | Davis | H04L 67/02 709/204 |
| 2013/0174223 | A1* | 7/2013 | Dykeman | G06F 21/10 726/4 |
| 2013/0223279 | A1 | 8/2013 | Tinnakornsrisuphap et al. | |
| 2013/0249679 | A1 | 9/2013 | Arling | |
| 2013/0262687 | A1 | 10/2013 | Avery et al. | |
| 2013/0276140 | A1* | 10/2013 | Coffing | H04L 12/5895 726/27 |
| 2014/0089243 | A1* | 3/2014 | Oppenheimer | G06F 21/50 706/46 |
| 2014/0096215 | A1* | 4/2014 | Hessler | H04L 63/0869 726/7 |
| 2014/0143839 | A1* | 5/2014 | Ricci | H04W 12/06 726/4 |
| 2014/0172595 | A1* | 6/2014 | Beddow | G06F 21/10 705/16 |
| 2014/0181910 | A1* | 6/2014 | Fingal | H04L 63/107 726/4 |
| 2014/0189808 | A1* | 7/2014 | Mahaffey | H04L 63/0853 726/4 |
| 2014/0196136 | A1* | 7/2014 | Hill | H04L 63/08 726/7 |
| 2014/0273940 | A1* | 9/2014 | Hyde | H04L 12/1478 455/406 |
| 2014/0282846 | A1* | 9/2014 | DeWeese | H04L 63/0428 726/1 |
| 2014/0317713 | A1* | 10/2014 | Gadotti | H04L 63/0853 726/7 |
| 2014/0337621 | A1* | 11/2014 | Nakhimov | G06F 1/163 713/168 |
| 2014/0337930 | A1* | 11/2014 | Hoyos | H04L 63/10 726/4 |
| 2015/0026785 | A1* | 1/2015 | Soon-Shiong | G06Q 30/0207 726/7 |
| 2015/0089597 | A1* | 3/2015 | Srinivasan | H04L 63/08 726/4 |
| 2015/0163056 | A1* | 6/2015 | Nix | H04L 9/0869 380/46 |
| 2015/0186636 | A1* | 7/2015 | Tharappel | G06F 21/32 726/8 |
| 2015/0250021 | A1* | 9/2015 | Stice | G06F 11/3051 710/16 |

OTHER PUBLICATIONS

ITU, 'The Mobile Money Revolution (Part 1: NFC Mobile Payments)', ITU, May 2013, ITU-T Technology Watch Report, entire document, https://www.itu.int/dms_pub/itu-t/oth/23/01/T23010000200001PDFE.pdf.*

"Revolutionary Smart TV Dongle Makes People Enjoy Gaming on LCD TV via Using Android Smartphone as Game Console, Mirror Instant Gaming Screen into LCD TV", Published on: Apr. 11, 2014, Available at: http://www.ronben.com/product/gamecast-reinvents-android-TV-dongle-GC-F1.htm.

"SmartGlass QR Code Sign In", Published on: Dec. 23, 2013, Available at: http://forums.xbox.com/xbox_forums/xbox_feedback/f/2607/t/1652169.aspx.

* cited by examiner

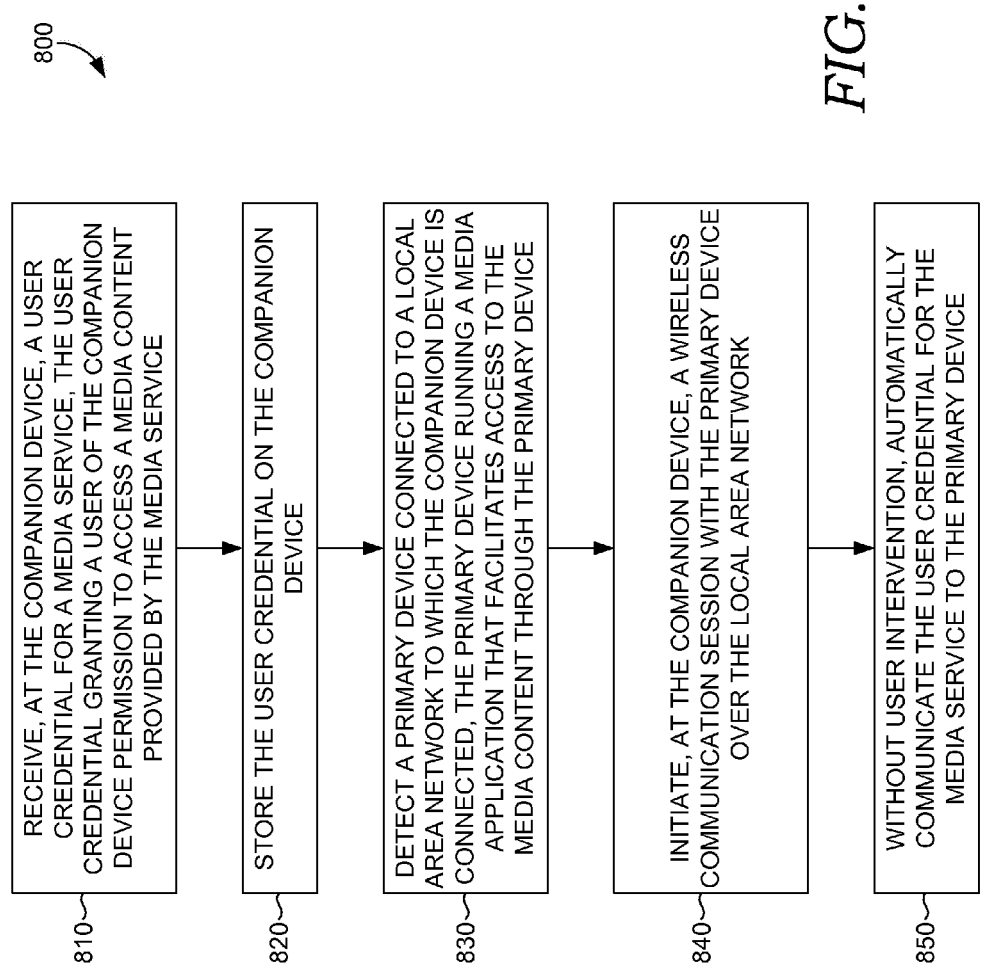

MULTIDEVICE AUTHENTICATION

BACKGROUND

Increasingly, entertainment devices use an authentication process to grant people access to the device. Further, entertainment services provided by the device may also require user authentication. Devices, such as game consoles, digital video recorders (DVR), and televisions, will present content, such as movies and songs, which originates on an online entertainment service.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Embodiments of the invention are described in detail below with reference to the attached drawing figures, wherein:

FIG. 8 is a flow chart showing a method of connecting a companion device to a primary device, in accordance with an embodiment of the present invention;

DETAILED DESCRIPTION

Figure 1:
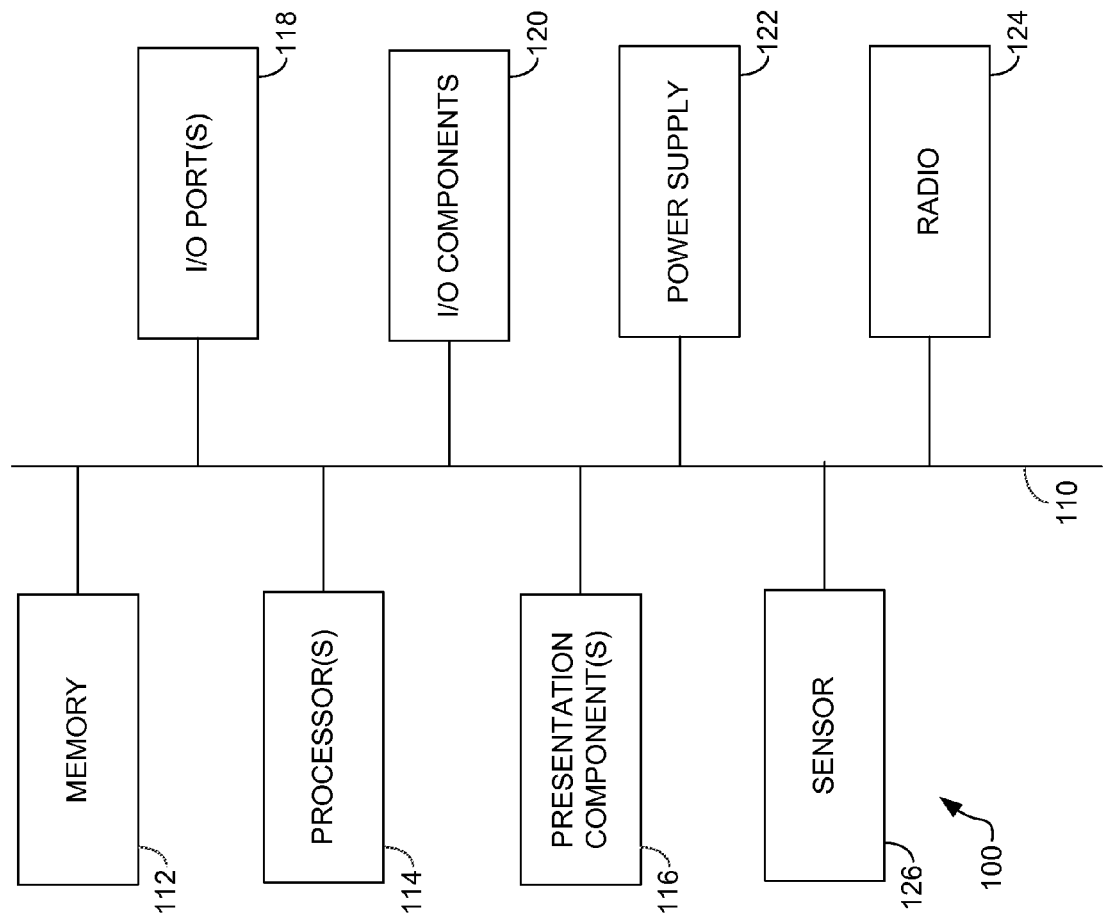
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention facilitate connection of a companion device to a primary device. The companion device may also be used to authenticate the user (e.g., login) with a primary device and/or one or more media services on the primary device. In one aspect, the companion device automatically passes user credentials to the primary device upon establishing a wireless communication session with the primary device. The user credentials may be used by the primary device to give the user access to media content. The media content may originate on the primary device or may be accessed from remote storage (e.g., a data center) through the primary device. For example, the user credentials may allow the primary device to stream movies from a media service to the primary device.

Aspects of the invention can make it easier and quicker for a user to connect a primary device and a companion device. Aspects can also log a user into a primary device in a more efficient manner. For example, aspects of the invention may eliminate the need for the user to supply user credentials directly to a primary device. Instead, the companion device recognizes relevant primary devices located proximate to the companion device and automatically initiates a user login to the primary device without user intervention. Aspects of the invention can automatically login a user to known and unknown primary devices. An unknown device is a primary device the user has not previously supplied user credentials to.

As an initial step, the user may provide account information for a media service to a companion application running on the companion device. The companion application is able to interact with the primary device and/or media applications on the primary device. In one aspect, the enhanced login process is managed by a multipurpose companion application that provides virtual controls on the companion device that can control the primary device and/or applications running on the primary device. This type of application may be described herein as a control application. In another aspect, a dedicated login application is used. The companion application may be provided by a media service associated with a primary device.

The companion application can allow a user to login to an unknown primary device, such as a friend's device or a newly purchased device. The companion device may send the user credentials to the primary device without user intervention. The credentials may be communicated over a wireless local area network both the primary device and the companion device are connected to. The primary device may then communicate the user credential to a media service to validate the credentials. Upon validation, the user associated with the companion device can be logged into the primary device. The user credentials can optionally be stored on the primary device depending on user preferences and settings.

The companion application can login a user to a known primary device, such as the user's own smart TV, upon connecting to the same LAN. For example, the companion device may be set to automatically connect to a LAN in the user's home. When the user comes home the companion device can connect to the LAN and then initiate a process to automatically log the user into one or more of the user's primary devices on the network.

In one aspect, the companion device monitors local area networks the device connects to for suitable primary devices. Upon finding a suitable primary device, the companion device may initiate a login process to the primary device.

As used herein, a "media service" is a remote service provided from one or more data centers. The media service can require a user account to provide a service to a client device associated with the user. The user account may be accessed through user credentials, such as a user name and password. Other types of user credentials such as biometric credentials are possible.

The media service may be associated with a primary device's operating platform. The platform may function apart from a connection to the media service at certain times. For example, a user with an established account may login to the platform on the primary device and access local functionality on the primary device. In one aspect, multiple users may be simultaneously logged into a media service though the primary device.

A platform integrated media application can exercise control over other applications on the primary device. For example, the platform integrated media application may store user credentials for other media services and automatically provide those user credentials when a user accesses one of the other media services, for example though a media application associated with the media service.

In various aspects, the media service may be associated with a media application that facilitates access to media content provided by the media service. Exemplary media content includes video games, videos, productivity applications, webpages, remote storage, social media, and music. The media content may be provided over a wide-area network, such as the Internet.

Media content may include tracking user achievements and user progress in a media content, even when the media is run on the primary device. For example, a user's progress though a video game played on a first game console (i.e., an exemplary primary device) may be tracked by the media service and provided to a second game console to allow the user to pick up at the progress point. In another example, a user's progress through a movie streamed through a first device may be recorded by the media service and used to automatically set a DVD playing on a second device to the point where the user stopped watching the streamed movie.

A control application is a companion application that allows a user to command and control experiences generated by an application running on a primary device. Web browsers, games, and streaming media applications are examples of applications running on a primary device that may be controlled using the companion device. Interfaces associated with each of the media applications on the primary device may be displayed on a television or other device coupled to the primary device.

As used herein, a "primary device" is a computing device that includes hardware and software that enables the primary device to run multiple media applications simultaneously and output a media presentation. The primary device is a consumer device that may be located in a user's residence and is not a remote server. Exemplary primary devices include a game console, a laptop computer, a personal computer, a television, a tablet, a smartphone, a set top box, and such.

The primary device may connect to multiple output devices to create an entertainment experience for the user. For example, a game console could be connected directly or indirectly to a television through which both video and audio output are presented. A game console could also be connected to an audio receiver that outputs audio content to speakers and visual content to a television. The primary device may also have audio and visual output mechanisms, such as a screen or speakers, built in.

As used herein, a "companion device" is a computing device with hardware components and software needed to generate a visible interface and input mechanisms the user can manipulate to interact with the interface. The companion device also has the ability to communicate with the primary device. For example, the companion device may have radio hardware and software necessary to connect to a wireless router and/or form a Bluetooth connection with the primary device. Alternatively, the companion device could use a wired connect such as a USB or Ethernet connection to communicate with the primary device. Exemplary companion devices include smartphones, tablets, and tablet PCs.

As used herein, a "media application" is an application that processes digital content to generate a user experience of the content. The user experience may include audio, visual, and tactile content. Exemplary media applications include an Internet browser, an entertainment streaming application (e.g., movie or audio streaming), a DVD playing application, a game application, a broadcast TV application, and such. The DVD application can read content on a DVD and deploy the primary device's hardware and software resources to present the DVD content to the viewer. The game application is not a video game title, but an application that deploys the primary device's hardware and software to execute the game code and create the game experience for the user.

Some media applications are able to be controlled by the control application on the companion device and others are not. In aspect, media applications that are able to be controlled are those that include that include an application program interface for the control application. Further, the user may be able to set preferences for whether or not an application can be controlled by the companion device. In aspects using user preferences, applications that are able to be controlled are those the user has given permission to be controlled.

The media titles are the entertainment content presented in the user experience. Different media applications can engage with different types of media titles. For example, an audio player may engage with songs in an MP3 format. A movie streaming application may receive a rendered video image of a movie title through a network connection.

As used herein, a "virtual control" is a software generated control. The virtual control is not a dedicated hardware control such as a volume button, knob, or similar. In one aspect, the virtual control is displayed on a touch screen and can be manipulated through the touch screen. For example, a contact on the touch screen corresponding to a location where the virtual control is displayed may constitute pressing the virtual control. Additional touch screen interactions with the virtual control are possible. Other possible interactions with a virtual control include sliding, spinning, tapping, and such. Another example of a virtual control is a virtual keyboard.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks, or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, an illustrative power supply 122, radio 124, and sensor 126. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, scanner, hard/soft button, touch screen display, etc.

Radio 124 transmits are receives radio communications. The computing device 100 may be a wireless terminal adapted to received communications and media over various wireless networks. Computing device 100 may communicate via wireless protocols, such as code division multiple access ("CDMA"), global system for mobiles ("GSM"), or time division multiple access ("TDMA"), as well as others, to communicate with other devices (not shown in FIG. 1). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Sensor 126 observes device and environmental characteristics and conditions. Exemplary sensors comprise accelerometers, gyroscopes, GPS/Location, proximity sensors, light sensors, and vibration sensors.

Companion Environment

Figure 2:
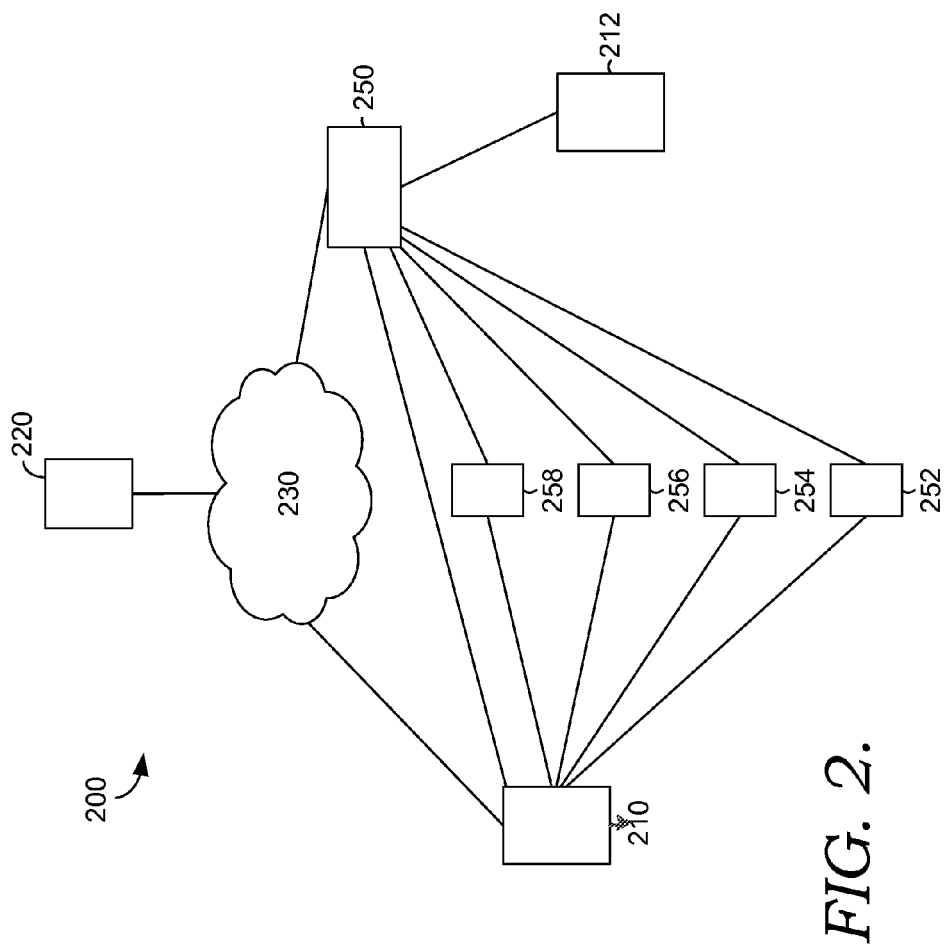
FIG. 2 is a diagram illustrating a variety of communication mediums between primary devices, online services, and companion devices, in accordance with an embodiment of the present invention.

Turning now to FIG. 2, a networked operating environment 200 comprising multiple computing devices that can provide a companion experience is shown, in accordance with embodiments of the present invention. The environment 200 includes a primary device 210, companion devices 252, 254, 256, and 258, a wireless router 250, a base station 260, a network 230 and a companion experience server 220. These devices are merely exemplary and are not intended to be limiting.

The primary device 210 may be a game console, media console, smart TV, DVD player, or other suitable computing device that presents titles. Titles may be games, movies, applications, music, videos, television shows, web pages, and other media content. The media content may be received from a remote content provider over a wide-area network, such as the Internet. The game console may be coupled to a display, such as a television.

The companion devices 252, 254, 256, and 258 are computing devices. A companion device, as used in this application, is a personal computing device that provides a second display and a control interface for applications running on the primary device. Examples include laptops, PCs, netbooks, smartphones, e-readers, PDAs, and tablets. A companion experience allows the user to interact with media applications running on a primary device 210 through interfaces on the companion device.

The companion experience server 220 can facilitate companion experiences by providing companion content, companion applications, registering and authenticating companion devices, facilitating communications between primary devices and companion devices, and performing other tasks. In an aspect, the authentication could be provided by other components computing environment 200. The companion experience server may be accessed via a wide-area network, such as the Internet. The companion experience server 220 can be omitted from some aspects of the present invention.

The companion devices 252, 254, 256, and 258 may communicate directly with the primary device 210 via Bluetooth, WiFi direct, or through another available interface. The companion devices could also communicate over a local wireless network generated by the wireless router 250. These connections could remain within a local area network "LAN" or they could be routed through the companion experience server 220. An exemplary LAN may be set up within a residence. The companion devices could also communicate with the primary device via a data service facilitated by base station 260. The base station 260 could route communications to the primary device 210 through whatever communication to the network 230 the primary device is using. The base station 260 could also be in direct communication with the primary device 210, if the primary device is using the same data service.

FIG. 2 shows multiple companion devices connecting to a single primary device 210. Though not shown, another exemplary computing environment could include multiple primary devices connecting to a single companion device. Alternatively, an exemplary computing environment could include multiple companion devices connecting to multiple primary devices.

Communication Session Between Primary Device and Companion Device

Figure 3:
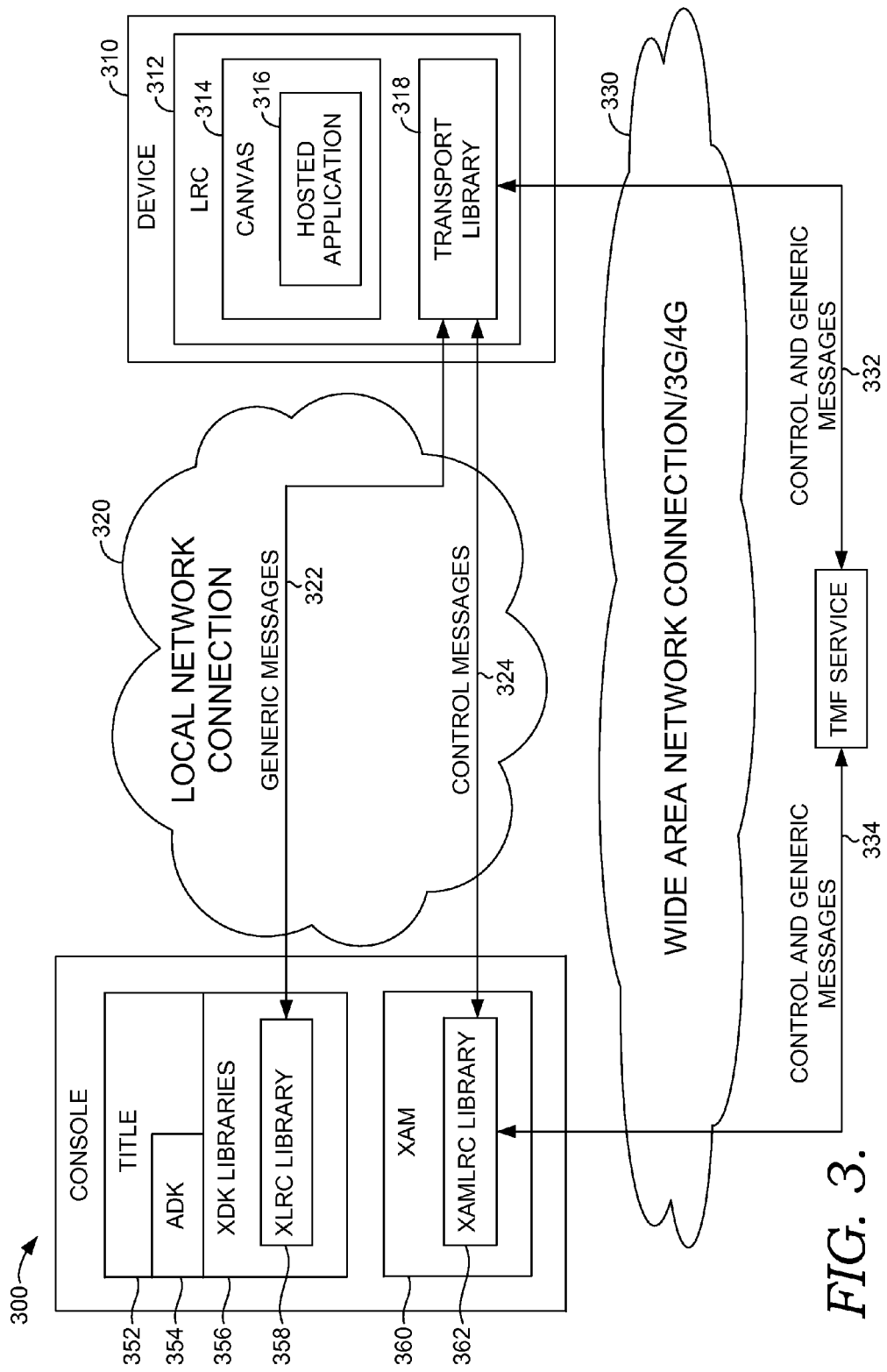
FIG. 3 is a diagram of a computing system architecture for generic messaging between a primary device and a companion device, in accordance with an embodiment of the present invention.

Turning now to FIG. 3, an exemplary diagram 300 is illustrated for generic companion-messaging between a device 310 and a console 350, in accordance with an embodiment of the present invention. The device 310 includes the LRC 312, the canvas 314, hosted application 316, and transport library 318. The console 350 includes the title 352, ADK 354, XDK libraries 356, XLrc library 358, XAM 360, and XAMLRC library 362. The title 352 may include console-based games and applications—written using either the XDK 356 or ADK 354. The ADK 354 is the console's application development kit. The XDK 356 is the console's development toolkit and includes the XLRC 358, which is the XDK 356 title library that implements the LRC 312 functionality and APIs. The XAM 360 is the system services and includes the XAMLRC 362 library that implements LRC 312 functionality and APIs. The XLrc library 358 refers to a console 350 (e.g. XBOX® provided by Microsoft Corporation of Redmond, Wash.) developer toolkit ("XDK") title library that titles need to link against to enable companion functionality. Canvas 314 is the container for hosting, title specific, hosted applications. The hosted application 316 may be a HTML5 page and its dependent CSS and JavaScript files, hosted on the developer's servers. Lastly, Transport library 318 includes both the existing TMF proxy for sending generic messages 322 and control messages 324 to support generic companion-messaging.

The components of the console 350 and the device 310 can provide an encrypted, communication channel between a title running on the console 350 and the LRC hosted application 316. The LRC 312 may also make use of the channel. The channel supports bidirectional, message-based communication with several delivery options: reliable, unreliable, and unreliable multicast/broadcast. Communication using this channel may be routed over the local network connection whenever possible on a per device basis. When the device 310 cannot connect directly to the console 350 over the local network connection, messages are delivered through a cloud-based service TMF service 340 in FIG. 3. Titles and hosted applications can determine from per-client data whether their connection is local, implying low latency. Embodiments support simultaneously connection of multiple companion platforms to the console 350 at any given point in time, regardless if they connected over the local network connection or through the TMF service 340. A hosted application may be a web based application loaded in an embedded browser that adds companion experiences to console based titles.

The generic companion-messaging session, automatically pairs a hosted application 316 on the companion platform with a title 352 on the console 350 based on a generic companion-messaging abstraction layer that facilitates platform-independent communication between the hosted application 316 and the title. Generic companion-messaging requires special codes to the console system services library ("XamLrc"), the title library that implements LRC functionality and APIs ("XLrc"), and the LRC Transport libraries. In one embodiments, the current XamLrc library is expanded to support multiple, connected devices over TCP. In another embodiment, only UDP is used with added reliability. In another embodiment, all code related to generic companion-messaging runs in the console system services ("XAM"), which would enable for easier protocol upgrades as there would be no generic companion-messaging protocol specific code running in title space. In another embodiment, the generic companion-messaging codebase is moved into the base platform-side API (e.g., XLrc library) running in title space. The abstraction layer also particularly supports the HTML Canvas 314; Canvas 314 is the container for hosting, title specific, hosted applications. The companion platform-side API provides abstraction for the generic companion-messaging to support dynamic scriptable rendering on the hosted application. The hosted application 316 may be a HTML5 page and its dependent CSS and JavaScript files, hosted on the developer's servers. The canvas is a companion platform control encapsulating the web browser control, JavaScript bridge, and object model exposed through the bridge to the HTML5 hosted in the control.

As part of the implementation of generic companion-messaging, a generic companion-messaging session (hereinafter "title message session") is implemented. These title message sessions are created on demand when a hosted application successfully connects to a title over the local network 320 or TMF service 340 via the wide area network 330. The TMF sends control and generic messages 332 and 334 between the device 310 and the console 350. Generic messages can include other title specific messages (e.g. touch and gesture events) delivered over the title to hosted application channel or TMF service 340. Generic messages may be title specific messages delivered over the title to hosted application channel or a TMF service 340. Simply, a title message session pairs the title and the hosted application together so that the XLrc 358 and XamLrc 362 can properly route and encrypt messages. A title message session may be initiated in association with a SDP ("Service discovery protocol"). An SDP is a network protocol which allows automatic detection of devices and services offered by these devices on a computer network. The SDP allows the console 350 to advertise a connection on the network and the device 310 to discover the network services of the console 350. Upon the configuration of the network configuration the title messaging session may begin initialization, and using the generic companion-messaging session, titles may send messages to a hosted application running on a specific client after they have received a notification indicating that specific client has connected implying a title message session has been established.

Both the device 310 and the console 350 need to be aware of the transport they employ for communication with one another. The device 310 transport library 318 attempts to establish a local network connection and therefore knows if it was successful. The console 350 is made aware of a local network connection when the device 310 successfully connects and then sends a title message session initialization message (e.g., XLRC_MESSAGE_CONNECT). Regardless, of the transport, the device 310 sends this message to initialize the title message session. Additionally, both the title 352 and the hosted application 316 can determine each devices transport when receiving information about each client.

One embodiment of generic companion-messaging uses reliable, point-to-point message delivery. The underlying transport is TCP for local network 320 connected devices. However, APIs may support unreliable delivery as well as broadcast addressing. Unreliable delivery may be used over UDP for local network 320 connected devices. Titles and hosted applications are expected to be aware that when messages are routed through TMF service 340 that delivery will be implemented using slower, reliable mechanisms. Lastly, broadcast addressing may be supported from the console 350 to all devices. Over reliable transports, this involves sending the message to each device 310 individually over TCP or the TMF service 340 depending on connectivity. Broadcast addressing over unreliable transports may be implemented using UDP multicast and the TMF service for those devices that are not connected directly.

The generic message may take different formats. In one embodiment, the message format supports three headers, one trailer, and several payloads. These message formats may include any additional framing that TMF service 340 adds for messages delivered using its service. The three headers may all share a common set of fields. To support generic companion-messaging a MessageKind (LRC_MESSAGE_KIND_GENERIC) is included in the message library. In one embodiment, the only valid data to be passed for a generic message is a Java Script Object Notation ("JSON") string, indicated with a new MessageType (LRC_MESSAGE_JSON).

Sequence numbers for LRC messages may be kept separately for control messages and generic messages. Simply, they originate in two different libraries on the console 350 and similarly different modules on the device 310. Keeping the sequence numbers separate allow the existing body of code dealing with matching a response with a request to continue to work unchanged.

The generic companion-messaging incorporates secure transport of messages so the console 350, devices 310, and TMF service 340 work together to provide a trustworthy system. From a security standpoint the device 310 is completely un-trusted when communicating with the console 350. The reverse is also true; the console 350 is completely un-trusted when communicating with the device 310. Additionally, it may be assumed that there are compromised devices on the local network 320 that are able to intercept all local network traffic. Service credentials (e.g., user account) are used to authenticate the user. Based on these credentials, a device 310 is allowed to rendezvous with a console 350 when the user on the companion platform is already signed into the console 350.

Given these constraints, traffic to and from the TMF service 340 is over HTTPS. The TMF service 340 may generate all encryption and signing keys. In one embodiment, the TMF service 340 generates a 128-bit HMAC_SHA1 key for signing all messages, ensuring no message has been tampered with. Additionally, the TMF service 340 generates a 128-bit AES key for encrypting all broadcast local network messages as well as per-device initialization messages. All clients (console and devices) receive these session-level signing and encryption keys when joining a session. These keys are changed and redistributed whenever a user on the console 350 signs out. To support per-device privacy, whenever a client joins a session it also receives a 128-bit AES key from the TMF service 340. The console 350 also receives this same key for each device 310 in the session. When a user signs out on the console 350, the keys associated with devices in the session where the same user was signed in are discarded and no longer used. A per-device encryption key allows the same user to sign in on multiple devices.

In one aspect, in an effort to mitigate some of the risk in having un-trusted, opaque data consumed by titles or hosted applications the contents of messages are accessible through a set of hardened function calls. The JSON protocol may be used for all generic message data. On the console 350, this will be exposed to the title developer through the XJSON Parser API. In the alternative, a concatenation of binary fields serialized using an API similar to .NET's BinaryReader may be used. The data size may be set to 1K bytes. Titles are written in such a way that if they are compromised on user's console then they can be revoked.

Remote Authentication

Figure 4:
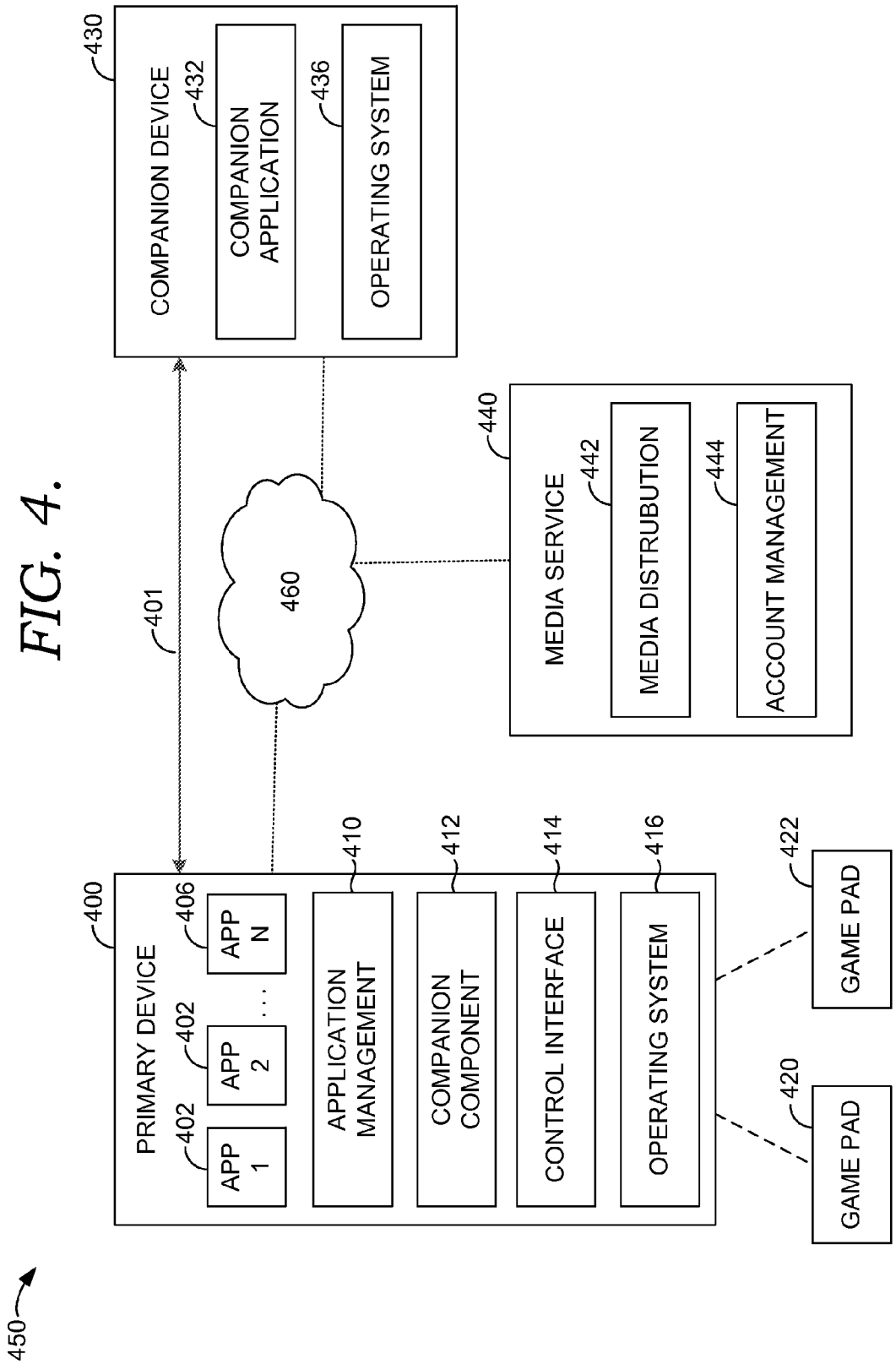
FIG. 4 is a diagram of a computing system architecture for controlling an application running on a primary device using a companion device, in accordance with an embodiment of the present invention.

Turning now to FIG. 4, an exemplary computing environment 450 suitable for connecting a companion device and a primary device is shown, in accordance with an aspect of the present invention. Exemplary computing environment 450 includes a primary device 400 connected to companion device 430 through network a local area network communication link 401. The communication link 401 may be formed in any manner including those described previously with reference to FIG. 2. The communication link 401 can be wired or wireless, direct or indirect. In one aspect, the communication link occurs over a local area network and the companion device 430 is located within the primary device's presentation area.

The primary device 400 is a computing device having hardware and software suitable for running multiple media applications. Exemplary media applications have been described previously and include applications capable of engaging video games, audio content, audiovisual content, webpages, or other content to generate a media presentation. The primary device 400 could be a game console, personal computer, tablet computer, television, cable box, or such. The primary device includes an operating system 416, a control interface 414, a companion component 412, an application management component 410, a first application 402, a second application 404, and an $n^{th}$ application 406. Aspects of the present invention are not limited to primary devices running three applications. Three applications were selected for use in this example for the sake of simplicity. One or more of the applications is a media application, as described previously.

The operating system 416 manages hardware resources on the primary device and enables the primary device 400 to run applications. A component associated with the operating system may be a media application as used herein. For example, a component of the operating system may work with a remote media service to provide manage user accounts on the primary device and manage access to remote content provided by the media service.

The control interface 414 receives input from one or more control devices such as a gamepad 420 and a gamepad 422. Other dedicated devices could include a remote control, a keyboard, a mouse, a microphone, and a camera. In one aspect, the camera may be used to provide a gesture interface. In one aspect, the microphone can be used to provide a natural language interface. The control devices may be used to control an application running in the control focus on the primary device 400.

The companion component 412 interacts with the control application 432 on the companion device 430. The companion component 412 generates instructions that are sent to the applications on the primary device. The applications respond to the instructions by manipulating the applications according to the instructions. The applications manipulated by the companion component 412 may be out-of-control focus on the primary device 400.

In an aspect of the invention, the companion component 412 interacts with the control application 432 to receive user credentials for one or more media services. The companion component may interact with a media service to validate the credentials. Once validated the user credentials may be saved in conjunction with a media application that facilitates a media presentation provided, at least in part, by the respective media service.

The application management component 410 manages viewports generated by different applications. A viewport may be in the foreground or background. The foreground and background state of a viewport may be changed using controls received by the control interface 414. Additionally or alternatively, the control application 432 may generate instructions to change the foreground/background state of an viewport. A foreground viewport may consume the entire display area available to the primary device when in full screen mode. Alternatively, a foreground viewport may consume less than the entire display area available to the primary device, such as 75% of the available display area, 50% of the available display area, or 25% of the available display area.

The application management component 408 may also provide a gatekeeper function to provide a user access to only media applications that the user is authorized to access. The application management component 408 may manage user credentials for one or more media applications. The user credentials may be a saved in association with a user account on the primary device and used to give automatic access to media services upon the user logging into the user account.

The companion device 430 is a computing device having hardware and software capable of generating a control interface for the user and communicating control instructions to the primary device 400. Exemplary companion devices include a tablet and a smartphone. The companion device 430 includes an operating system 436 that manages the companion device's hardware. The companion device 430 and the primary device 400 can run different operating systems. Alternatively, the companion device 430 and the primary device 400 can run the same operating system. The companion device can include a touch screen.

The control application 432 generates an active-application interface that presents information about one or more applications running on the primary device and allows the user to open up an application-specific control interface. The application-specific control interface can be used to control an application running on the primary device. The control application 432 can target a different process or application running on the primary device. The targeting defines which application will be controlled by the control application 432 through the companion device 430. The user may switch the control application's targeting from application to application. The control application 432 may target an application that is in control focus or out-of-control focus on the primary device. As used herein, targeting refers the application being controlled by the control application 432 through the companion device.

The control application 432 may be used to login a user to a primary device. As described in more detail with reference to FIG. 8, the control application 432 can store user credentials for one or more media services and communicate the user credentials to a primary device upon forming a communication link with the primary device. In one aspect, the control application 432 monitors a local area network the companion device 430 is connected to for primary devices and then initiates a communication link with the primary device.

The control application 432 may provide an interface through which user credentials are entered. The control application 432 may provide other interfaces that help the user connect to a primary device, for example, by responding to a security challenge.

The media service 440 is operated from one or more data centers and can connect with the primary device 400 and the companion device 430 over wide area network 460. The media service 440 can require a user account to provide a service to a client device associated with the user. The user account may be accessed through user credentials, such as a user name and password. Other types of user credentials such as biometric credentials are possible. The user account management component 444 manages user accounts and authentication policies for the media service.

The media service 440 may be associated with a primary device's operating platform. The platform may function apart from a connection to the media service 440 at certain times. For example, a user with an established account may login to the platform on the primary device 400 and access local functionality on the primary device 400. In one aspect, multiple users may be simultaneously logged into a media service 440 though the primary device 400.

A platform integrated media application can exercise control over other applications on the primary device 400. For example, the platform integrated media application may store user credentials for other media services and automatically provide those user credentials when a user accesses one of the other media services, for example though a media application associated with the media service. In various aspects, the media service may be associated with a media application that facilitates access to media content provided by the media service. Exemplary media content includes video games, videos, productivity applications, remote storage, social media, and music. The media distribution component 442 can facilitate communication of media content to a primary device 400.

Figure 5:
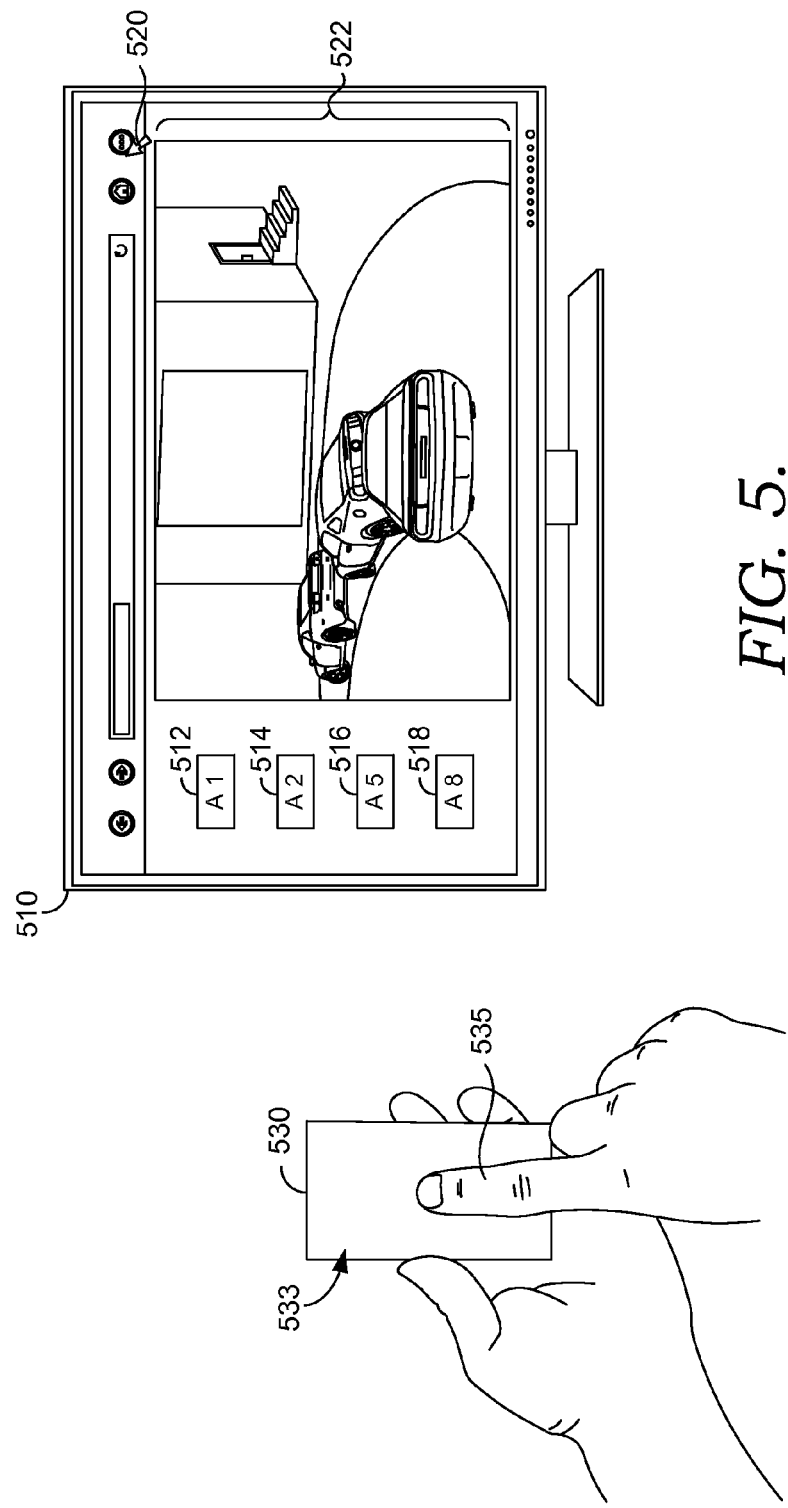
FIG. 5 is a diagram of a person using a companion device to control media applications on a primary device, in accordance with an embodiment of the present invention.

Turning now to FIG. 5, a presentation area 500 is shown, in accordance with an aspect of the present invention. The presentation area 500 includes a primary device 510 and a companion device 530. The primary device 510 is a smart television, in this example. Five applications are running on the primary device 510. The applications include a game application engaged with a driving game title generating interface 522. The application 512 is running in the foreground on the primary device. The application associated with A1 block 512, the application associated with A2 block 514, the application associated with A5 block 516, and the application associated with A8 block 518 are all running in the background. In the example shown, the blocks may provide a mechanism for a user to move one of the associated applications into the foreground which may cause the application associated with the interface 522 to be moved to the background. In one aspect, only one application may be in the foreground of the primary device at any given point. The interface on the primary device also includes a utility bar 520.

A control application running on companion device 530 may generate an interface 533 that the user can interact with using his finger 535. The interface 533 may be used to control one of the applications running in the background without disrupting gameplay or altering the interface 522.

Figure 6:
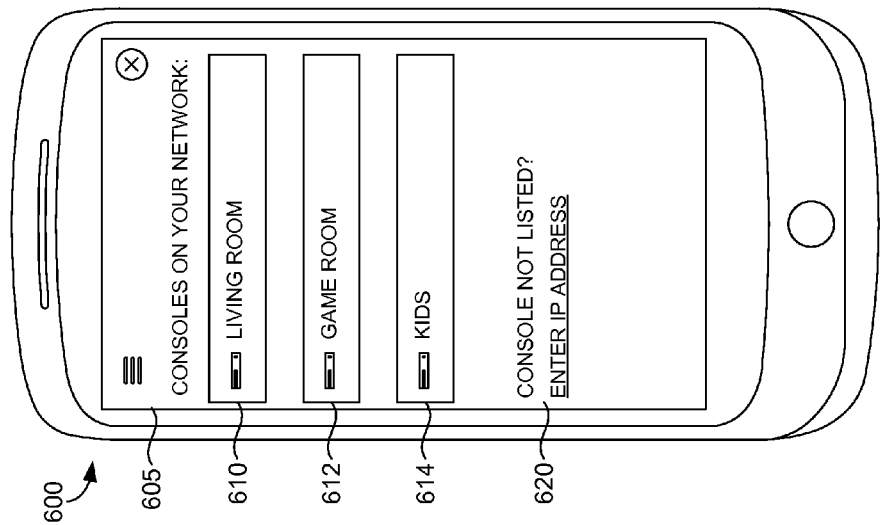
FIG. 6 is a diagram of a companion device showing a connection interface that shows primary devices the companion device can connect with, in accordance with an embodiment of the present invention.

Turning now to FIG. 6, a companion device 600 displaying a connection interface 605 is shown, in accordance with an aspect of the present invention. The connection interface 605 may be displayed in response to a user request for the connection interface. The user request may be made by pushing a connection button on an interface associated with a control application, a button on a home screen, or on some other higher level interface.

In an aspect, the connection interface 605 is automatically displayed upon the companion device 600 connecting to a local area network having one or more primary devices capable of connecting to the companion device. The primary devices displayed may be limited to those including an application for a media service associated with an application installed on the companion device 600.

The connection interface 605 lists three primary devices available on a local area network. The primary devices include a living room device 610, a game room device 612, and a kids device 614. The designations living room, game room, and kids may be descriptions a user has associated with individual devices for purposes of identification to other devices. Upon selecting any of these three devices, a method to connect to the selected device can be initiated. In addition, a device details interface may be opened that allows the user to set preferences related to the device, such as whether or not the user wishes to connect automatically to the device in the future.

The connection interface 605 also includes a link 620 to an interface that allows a user to identify a device not shown on the connection interface 605. Selecting the link 620 opens the new device interface 705 shown in FIG. 7.

Figure 7:
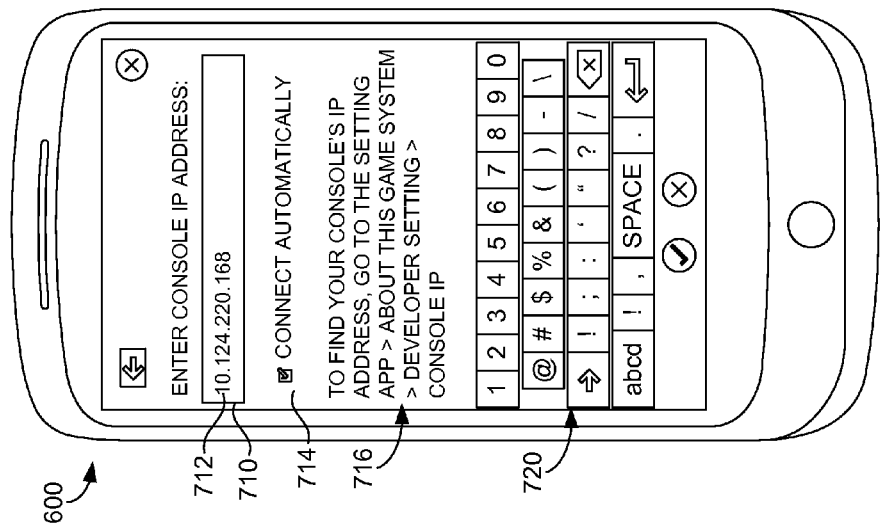
FIG. 7 is a diagram of a connection interface that allows a user to input identification information for a companion device, in accordance with an embodiment of the present invention.

Turning now to FIG. 7, a new device interface 705 is shown, in accordance with an aspect of the present invention. The new device interface 705 includes an identification input box 710 where the user enters the device's IP address 712 by typing on keyboard 720. Other types of device identification could be used, such as a device's Media Access Control ("MAC") identification, or any other unique way to identify a device.

As indicated by an instruction 716, most devices include a method for the user to find the device's IP address. The instruction 716 includes exemplary language to navigate through a series of interfaces to find the primary device's IP address. Different primary devices may have different mechanisms for finding the IP address. In one aspect, the instruction 716 is customized for the type of primary device the user wishes to connect with. The future connection function 714 allows the user to specify whether or not the companion device 600 should automatically connect to the new primary device in the future.

Figure 9:
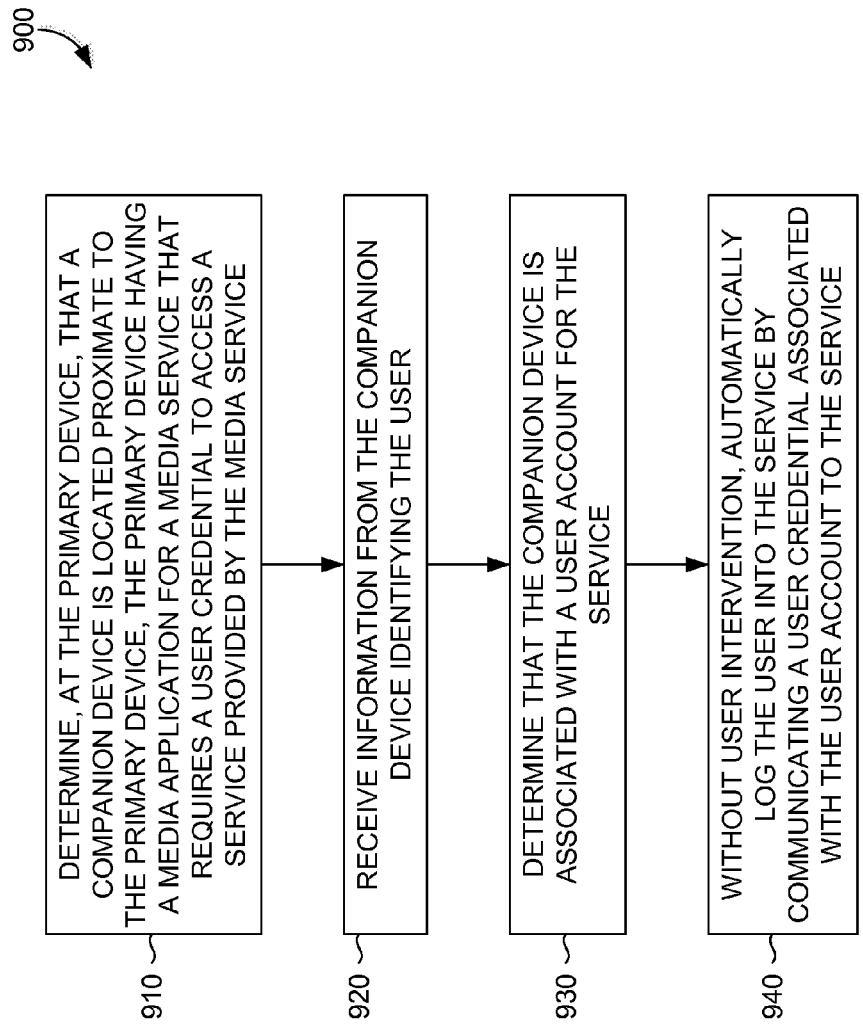
FIG. 9 is a flow chart showing a method of connecting a companion device to a primary device, in accordance with an embodiment of the present invention.

Upon entering the IP address 712, the companion device 600 can initiate a method to identify the primary device associated with the IP address 712 in connection to the device according to methods described hereafter, including with reference to FIG. 9.

Turning now to FIG. 8, a method 800 of connecting a companion device to a primary device is shown, in accordance with an aspect of the present invention. Method 900 may be performed on a companion device, such as a smartphone or tablet. In one aspect, method 900 is performed by a media application running on the companion device. The media application may be a control application that allows the companion device to control one or more programs running on the primary device. In one aspect, the media application is associated with a media service that provides content on the primary device. The user may register the companion device with the media service by installing a companion application for the media service on the companion device and providing the user's account information for the media service.

In one aspect, the application performing the method 800 is a control application that allows the user to interact with and control media on the primary device. In another aspect, method 800 is performed by an application that manages the user's account information for various media services or only a single media service. The media may be provided to the primary device over a network connection to the remote media service. The control application may also be associated with a primary device's operating system or user account management operations whether or not those operations are provided by the operating system. As used herein, a media application includes account management functions performed natively by a primary device.

For example, a device may register multiple users and allow users to have different preferences and levels of access to services provided by the device. Logging in as a particular user on a primary device can enable applications running on the primary device to identify the user of the primary device as a particular person. For example, passwords, cookies, and other identification information associated with a web browser could identify a user logged in to a particular account to third-party webpages, such as shopping sites, or other sites that ask for a user ID.

In addition to providing access to media content, the user accounts on the primary device can also be associated with a remote media service that can record user achievements, for example in the video game context, so that a user is able to maintain a remote record of progress within a video game across multiple devices. For example, a user can play a video game on a friend's console and then start playing again on his own game console at a point of progress he achieved on his friend's game console.

Method 800 can provide improved user efficiency by automatically granting the user access to a primary device and automatically logging the user into one or more media services provided by the primary device without the user needing to provide a variety of information directly to the primary device.

At step 810, a user credential for a media service is received at the companion device. The user credential grants a user of the companion device permission to access a media content provided by the media service. In one aspect, the media service is a cloud-based service provided by computers operating in a data center that is remote from both the companion device and the primary device. For example, the media service may provide streaming videos, streaming music, multiplayer video game coordination, streaming video games, and other media services.

In one aspect, the user credential is an account identification and a password. In one aspect, the user credential is received when the user supplies the user credential to the companion device through an interface provided on the companion device. For example, the interface could ask the user for the user's password and account identification information for the media service.

At step 820, the user credential is stored on the companion device. The user credential may be stored in a way that it is only accessible by a control application performing method 800 on the companion device.

At step 830, a primary device is detected to be connected to a local area network to which the companion device is also connected. The local area network may be a wireless network managed by a wireless router within a facility, such as a home or apartment. In another aspect, the local area network is a Wi-Fi, direct connection between the primary device and the companion device. Other types of local area networks are possible. The primary device is running a media application that facilitates access to the media content through the primary device. In one aspect, the media application is associated with the media service and generates an interface through which media provided by the service is displayed and controlled. For example, a movie streaming service may provide an interface through which movies are selected and displayed.

In one aspect, the user has not previously connected to the primary device using the companion device. In another aspect, the user has never accessed the primary device directly. For example, the user may be visiting a friend's house or have just purchased the primary device.

In one aspect, the connection of the primary device to the companion device is detected after the companion device connects to the local area network. For example, the local area network may require a password or other code to be supplied by the companion device to connect to the network. The user may have supplied this code previously and selected an auto connect option. In either case, the companion device may identify other devices on the local area network upon connecting. In one aspect, different devices in the local area network, including computers, tablets, printers, and others, are distinguished from a primary device that includes the media application. In one aspect, multiple primary devices may be connected to the local area network. An interface may be provided on the companion device that allows the user to select a primary device the user wishes to connect to. In one aspect, the user may be asked to provide information identifying a primary device that is not automatically identified.

At step 840, a wireless communication session with the primary device is initiated over the local area network by the companion device. The wireless communication session may be initiated after the user selects the primary device from an interface showing primary devices connected to a local area network. The wireless communication session may be set up as described in FIG. 3 or using other methods of establishing a wireless communication session. The wireless communication session allows the companion device and the primary device to communicate with each other over the local area network.

Prior to initiating the wireless communication session, the primary device may request a passcode that is separate from the user credential in order to grant access to the primary device in the first place. Upon receiving this request, the user is asked through an interface on the companion device to supply the passcode. The user may then enter the passcode, which is in turn provided to the primary device over the wireless connection. The passcode may be stored for subsequent use in accessing the primary device. The use of a passcode to grant access to the device may be used when the device is on a public wireless network, such as in a dorm, to limit access to the device. The owner or manager of the device may supply the passcode to people he wants to access his primary device. As an alternative, to the user providing a passcode, the primary device could supply a passcode to the companion device via an electronic means. In one aspect, the electronic means only works over short distances or otherwise requires proximity to the primary to work. For example, the primary device could output a Quick Response "QR" code containing the passcode that could be read by a camera on the companion device and then extracted. Alternatively, the primary device could output the passcode via ("radio frequency identification") RFID that is received by the companion device.

As an alternative or in addition to the passcode, evidence of physical proximity to the primary device may be required. For example, a button may need to be pushed on the primary device to start a time period, such as one minute, for new devices to register with the primary device. Requiring a user to perform a gesture within a camera's viewing area may serve as proof of proximity. For example, the companion device may display an instruction for a user to wave to the left and right and then up and down. Requiring proof of proximity can help prevent neighbors or others from attempting to access the primary device.

At step 850, without user intervention, the user credential for the media service is automatically communicated to the primary device from the companion device. The user does not need to re-enter the user credential. Instead, the user, upon selecting the primary device, is automatically logged into the media service by virtue of the user credential being saved on the companion device. In one aspect, the user credential is only supplied upon first determining that the primary device is an unknown primary device. An unknown primary device is a device to which the companion device has not connected previously or has no record of previously forming a connection. In one aspect, the companion device stores a record of each primary device that has previously been accessed. The absence of a record identifying a primary device renders the primary device unknown to the companion device.

In one aspect, upon connecting to the primary device, a record of the connection is added to a list of devices stored on the companion device. Alternatively, primary devices known to the companion device are stored at a data center that manages a user account for the user of the primary device. Thus, upon saving a record of the primary device, the primary device will become a known primary device to the companion device.

In one aspect, a user of a companion device is able to specify one or more primary devices that the user should automatically be logged into upon the companion device detecting the primary device on a local area network. For example, a companion device could automatically log a user in to his primary device upon entering his apartment as the companion device automatically connects to the local area network within his apartment.

In another aspect, a companion device automatically connects to a known or unknown primary device only upon satisfaction of one or more triggers. The triggers may be set by a user. The triggers may be associated with user actions consistent with using a companion device. For example, a trigger could be the user pulling a companion device out of his pocket. A camera on the companion device in combination with accelerometers may be able to detect that the companion device has been removed from the user's pocket.

In another aspect, a unique gesture made with the companion device may serve as a trigger to log a user into a primary device. For example, a user may waive a companion device in a wide circle motion, rotate a companion device multiple times on an axis, or such. In one aspect, these gestures may be performed with the companion device locked, so long as the application facilitating or performing method 800 is running on the companion device.

Turning now to FIG. 9, a method 900 for connecting a companion device to a primary device is shown, in accordance with an aspect of the present invention. In one aspect, method 900 is performed on a primary device, such as a smart TV, personal computer, game console, set-top box, or digital video recorder.

At step 910, a determination is made at the primary device that a companion device is located proximate to the primary device. The primary device has a media application for a media service that requires a user credential to access a service provided by the media service. In one aspect, the companion device is determined to be located proximate to the primary device by determining that the companion device and the primary device are connected to the same local area network. As mentioned, the local area network may be a Wi-Fi, direct connection between the companion device and the primary device or a connection between the companion device and a router located within a facility, such as a home or apartment. In another aspect, the companion device's proximity to the primary device is detected by identifying the companion device in an image or video provided to the primary device, for example, by a camera in communication with the primary device that has a view of an area proximate to the primary device.

At step 920, information is received from the companion device identifying the user of the companion device. The information may comprise a user credential, such as an account identifier and a password. The information may also include information that identifies a device, such as a MAC address for the device. The MAC address for the device may be registered with the media service when an application that interacts with the media service is installed on the companion device.

At step 930, the companion device is determined to be associated with a user account for the service. In one aspect, the determination is made by communicating the identification information to an account management resource associated with the media service. The account management resource may be provided through a data center. The account management resource may keep a record of devices that have been authenticated as associated with a particular user. The account management application can validate that the user is authorized to use the service and even provide user credentials to the primary device in response to recognizing the companion device based on information other than the user credential. Alternatively, user credentials could be provided by the companion device, in which case, identifying a device provides an additional security mechanism to validate the user.

A account management application may also communicate account information to the primary device for the user's account. The account information may include user preferences and settings for the primary device. The account information may also include a description of services and/or media the user has access to through the media service.

At step 940, without user intervention, the user is automatically logged into the service by communicating a user credential associated with the user account to the service. The user credentials may subsequently be stored along with the device identification information. The next time the user connects to the primary device, the user credentials may be automatically used to log the user into the service. The user may be logged into the service whether or not the user intends to use the service. For example, the user may enter a friend's house and automatically be logged into the service on the friend's primary device by virtue of the user's companion device being authenticated. The user does not need to open a media application or provide any information through either the primary device or the companion device at the time of login. The user does need to have an account with the media service and have previously authenticated his device with the media service, such as by entering his user credentials into an application installed on the companion device that is associated with the media service.

In one aspect, the media service provides a biometric template for the user in response to the primary device's request to validate the user. The biometric template may be provided as part of the authentication process for the device. The companion device may then receive a biometric reading for the user. In one aspect, the biometric reading is an image of the user or a derivative of a user image, such as a point analysis of the user's face, that can be used to identify the user. The biometric template includes either an image of the user or a derivative of an image that can be used to compare to other images of the user. The biometric reading is validated against the biometric template prior to logging the user into the media service. The biometric credential is an addition to the user credential, which may take the form of an account identification and password. Other forms of biometric readings include fingerprints, iris scans, and such. In one aspect, a fingerprint reading is taken by a the companion device and communicated to the primary device for comparison with the biometric template.

In one aspect, the companion device is challenged prior to allowing the companion device to connect to the primary device and provide identification information. Thus, there may be a separate process to access the primary device and to login to a media service on the primary device. The primary device may determine that the companion device is not currently authorized to access the primary device. This determination may be made in response to a user setting on the primary device that restricts access to companion devices. In other aspects, the additional challenge can be turned off by allowing all companion devices to connect to the primary device. Even when any device may connect to the primary device, the previously described user authentication process can be used to log the user into the media service or media service application running on the primary device.

In response to determining that the companion device is not currently authorized to access a primary device, a challenge message is communicated to the companion device requesting a code. The code is different from the user credential or device identification information. The user may provide the code through an interface on the companion device and the code may be communicated to the primary device, which receives the code and then authorizes the connection. A companion device may then be added to a list of authorized companion devices that are able to automatically connect with the primary device. A list of authorized devices may be accessible to a user of the primary device. The list may be edited by the user to remove companion devices from the list. Once removed from the list, the user and/or the companion device would not have access to the primary device. Access to the primary device may be separate from access to the media application or service.

As mentioned, the media service may comprise a platform account management system running on the primary device. The account management system may associate input received from different controllers and devices with different accounts. For example, a game console may receive inputs for multiple game pads and control different players in a video game based on the respective inputs. The players may be associated with user accounts and the achievements earned during a game credited to the user's account. The companion device may act as a controller for some video games, in which case control inputs received from the companion device are associated with the player tied to the user's account.

Figure 10:
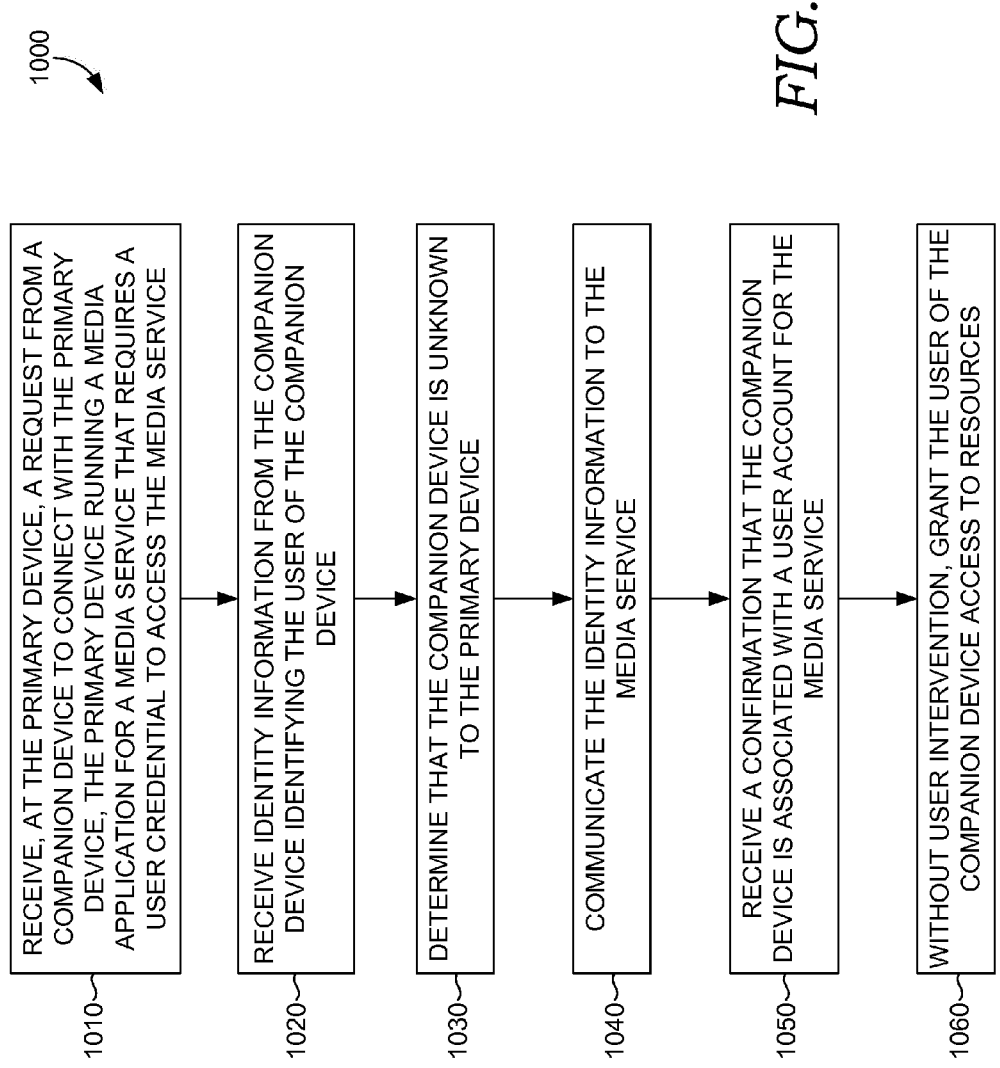
FIG. 10 is a flow chart showing a method of connecting a companion device to a primary device, in accordance with an embodiment of the present invention.

Turning now to FIG. 10, a method 1000 for connecting a companion device to a primary device is provided, in accordance with an aspect of the present invention. In one aspect, method 1000 is performed on a primary device, such as a smart TV, personal computer, game console, set-top box, or digital video recorder.

At step 1010, a request is received at the primary device from a companion device to connect with the primary device. The primary device is running a media application for a media service that requires a user credential to access the media service.

At step 1020, identity information is received from the companion device identifying a user of the companion device. In one aspect, the identity information comprises a user credential for the media service.

At step 1030, the companion device is determined to be unknown to the primary device. An unknown companion device is a device to which the primary device has not connected previously or has no record of previously forming a connection. In one aspect, the primary device stores a record of each companion device that has previously been connected. The absence of a record identifying a companion device renders the companion device unknown to the primary device.

In one aspect, upon connecting to the companion device, a record of the connection is added to a list of devices stored on the primary device. Alternatively, companion devices known to the primary device are stored at a data center that manages a user account for the user of the primary device. Thus, upon saving a record of the companion device, the companion device will become a known companion device to the primary device.

In one aspect, a user of a primary device is able to specify one or more companion devices that should automatically be logged into the primary device forming a white list of authorized companion devices. For example, a primary device could automatically log a user into a media service upon detecting a phone associated with a user connecting to the companion device's local area network.

At step 1040, the identity information is communicated to the media service. In one aspect, the identity information is communicated to a log-in interface with the media service. The identity information can include user account credentials for multiple services.

At step 1050, a confirmation is received that the companion device is associated with a user account for the media service. In one aspect, the confirmation may be a log-in confirmation.

At step 1060, without user intervention, the user of the companion device is granted access to a resource regulated by the media service. In one aspect, the resource is access to the primary device. In this aspect, access to the primary device can be controlled by the media service. In other words, the user may need an account with the media service to receive access or full access to the primary device's resources. Thus, the media service provided can be a user authentication function. The authentication service may be a stand-alone service or combined with other media services.

The resource can include applications running on the primary device that facilitate access to one or more media services, such as streaming video games or movies. The primary device can be capable of running multiple applications simultaneously that provide access to different media services. In one aspect, the resource is the ability for the primary device to access the media service, including for the first time or for the first time on behalf of the user.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method of connecting a companion device to a primary device, the method comprising:
    receiving, at the companion device, a user credential for a media service, the user credential granting a user permission to access media content provided by the media service;
    storing the user credential on the companion device;
    determining that the companion device is located proximate to the primary device by determining that the companion device and the primary device are connected to the same local area network and by receiving a return of a quick response code, from the companion device, which was generated by the primary device;
    prior to initiating a wireless communication session between the primary device and the companion device, the companion device is granted access to the primary device by the returned quick response code;

determining, at the companion device, that the primary device is an unknown primary device when the user has not previously supplied the user credential to the primary device and the primary device is further determined to be unknown because the companion device does not have access to a record that indicates the primary device is a known primary device that the user has previously accessed;

running, on the primary device, a media application that facilitates access to the media content through the primary device, the media application requiring the user credential to access the media content; and establishing the wireless communication session between the companion device and the primary device over the local area network and in combination with the companion device being proximate to the primary device, causing, without user intervention, the user credential for the media service to automatically communicate to the primary device.

2. The method of claim 1, wherein the method further comprises:

receiving, at the companion device, a security challenge message from the primary device, the security challenge message requesting a code for access to the primary device that is separate from the user credential for the media service;

outputting for display on the companion device a connection interface including a text entry interface for the user to enter the code;

receiving, at the companion device, the code from the text entry interface; and communicating the code from the companion device to the primary device.

3. The method of claim 1, further comprising:

detecting, at the companion device, one or more primary devices running the media application;

receiving a user selection of the primary device from a connection interface that identifies the one or more primary devices.

4. The method of claim 1, wherein the local area network is a Wi-Fi direct connection between the companion device and the primary device.

5. The method of claim 1, wherein the media service consists of one or more of a video streaming service, a video game service, and a productivity service.

6. The method of claim 1, further comprising:

saving a record at the companion device that the primary device is a known primary device;

storing the user credential of the companion device used to provide access on the companion device to the media content provided by the media service; and without user intervention, when the primary device is a known device, automatically authenticating the companion device with the media service using the stored user credential.

7. The method of claim 1, wherein when the primary device is a known primary device, not communicating the user credential for the media service from the companion device to the primary device.

8. One or more computer storage media comprising computer-executable instructions embodied thereon that, when executed by a computing device, connect a companion device to a primary device, the instructions causing the computing device to:

receive, at the primary device, information from the companion device identifying a user of the companion device, the primary device having a media application for a media service that requires a user credential to access a service provided by the media service;

determine, at the primary device, from the information that the companion device is associated with a user account for the media service;

determine that the companion device is located proximate to the primary device by determining that the companion device and the primary device are connected to the same local area network and by receiving a return of a quick response code, from the companion device, which was generated by the primary device;

prior to initiation of a wireless communication session between the primary device and the companion device, the companion device is granted access to the primary device by the returned quick response code;

establish the wireless communication session between the companion device and the primary device over the local area network and in combination with the determined companion device being in proximate to the primary device, without user intervention, automatically log the user into the media service at the primary device by communicating the user credential associated with the user account from the primary device to the media service, the user credential being used to log the user into the media service via the primary device.

9. The media of claim 8, wherein the instructions further cause the computing device to:

receive, at the primary device, a biometric template for the user from the media service;

receive, at the primary device, a biometric reading for the user; and validate, at the primary device, the biometric reading against the biometric template prior to logging the user into the media service, wherein the biometric template is additional to the user credential.

10. The media of claim 9, wherein the biometric reading is an image of a face of the user.

11. The media of claim 8, wherein the instructions further cause the computing device to:

receive a connection request from the companion device;

determine, at the primary device, that the companion device is not currently authorized to access the primary device;

communicate, from the primary device, a challenge message to the companion device requesting a code that is different from the user credential;

receive, at the primary device, the code from the companion device;

authorize the companion device to access the primary device; and add the companion device to a list of authorized companion devices that are able to automatically connect with the primary device.

12. The media of claim 8, wherein the instructions further cause the computing device to receive, at the primary device, a control instruction from the companion device and manipulating a video game state for a video game running on the primary device on behalf of the user, wherein multiple users are logged into the primary device with different user accounts.

13. The media of claim 8, wherein the instructions further cause the computing device to communicate a progress report to the media service that describes progress made on a media title.

14. The media of claim 8, wherein the instructions further cause the computing device to:

communicate identification information for the companion device to the media service.

15. One or more computer storage media comprising computer-executable instructions embodied thereon that, when executed by a computing device, connect a companion device to a primary device, the instructions causing the computing device to:
  determine that the companion device is located proximate to the primary device by determining that the companion device and the primary device are connected to the same local area network and by receiving a return of a quick response code, from the companion device, which was generated by the primary device;
  prior to a initiated wireless communication session between the primary device and the companion device, the companion device is granted access to the primary device by the returned quick response code;
  receive, at the primary device, a confirmation that the companion device is associated with a user account for the media service;
  determine, at the primary device, that the companion device is unknown to the primary device, when the user has not previously supplied the user credential to the primary device and the primary device is further determined to be unknown because the companion device does not have access to a record that indicates the primary device is a known primary device that the user has previously accessed;
  establish a wireless communication session between the companion device and the primary device over the local area network and in combination with the determined companion device being in proximate to the primary device, without user intervention, automatically log the user into the media service at the primary device by communicating the user credential associated with the user account from the primary device to the media service, the user credential being used to log the user into the media service via the primary device.

16. The media of claim 15, wherein the instructions further cause the computing device to:
  receive, at the primary device, the user credential for the media service from the companion device; and
  store the user credential on the primary device in association with the identity information.

17. The media of claim 16, wherein the instructions further cause the computing device to:
  receive, at the primary device, the identity information from the companion device identifying the companion device.

18. The media of claim 15, wherein the instructions further cause the computing device to:
  receive, at the primary device, a biometric template for the user from the media service,
  receive, at the primary device, a biometric reading for the user; and
  validate, at the primary device, the biometric reading against the biometric template prior to granting the companion device access to the primary device, wherein the biometric template is additional to the user credential.

19. The media of claim 18, wherein the biometric reading is an image of a face of the user.

* * * * *